United States Patent
Künzner et al.

(10) Patent No.: US 8,786,758 B2
(45) Date of Patent: Jul. 22, 2014

(54) METHOD AND APPARATUS FOR IMAGING A SURROUNDING AREA ONTO A DETECTOR DEVICE

(75) Inventors: Nicolai Künzner, Markdorf (DE); Thomas Künstle, Überlingen (DE); Hans Dieter Tholl, Uhldingen-Mühlhofen (DE); Michael Gross, Salem (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 841 days.

(21) Appl. No.: 13/019,391

(22) Filed: Feb. 2, 2011

(65) Prior Publication Data
US 2011/0187918 A1    Aug. 4, 2011

(30) Foreign Application Priority Data
Feb. 3, 2010   (DE) .................. 10 2010 006 664

(51) Int. Cl.
H04N 5/225    (2006.01)

(52) U.S. Cl.
CPC .................................. *H04N 5/2254* (2013.01)
USPC ........................................................ 348/342

(58) Field of Classification Search
CPC ....... H04N 5/2254; H04N 9/045; G02B 27/46
USPC ......... 348/342, 164, 273, 360, 362, 367, 335, 348/359, 221.1
See application file for complete search history.

(56) References Cited

U.S. PATENT DOCUMENTS

| | | | |
|---|---|---|---|
| 3,020,406 A | 2/1962 | Whitney | |
| 4,842,396 A | 6/1989 | Minoura et al. | |
| 4,848,879 A | 7/1989 | Nishimura et al. | |
| 5,351,151 A | 9/1994 | Levy | |
| 5,448,382 A | 9/1995 | Land et al. | |
| 5,708,522 A | 1/1998 | Levy | |
| 6,031,588 A | 2/2000 | Dultz et al. | |
| 8,373,757 B1 * | 2/2013 | Nguyen | 348/164 |
| 8,547,473 B2 * | 10/2013 | Rungenhagen et al. | 348/342 |

(Continued)

FOREIGN PATENT DOCUMENTS

| | | |
|---|---|---|
| DE | 4305807 A1 | 10/1994 |
| DE | 10 2004 018 182 A1 | 4/2005 |
| EP | 0803760 A2 | 10/1997 |
| WO | 93/02380 A1 | 2/1993 |

*Primary Examiner* — Aung S Moe
(74) *Attorney, Agent, or Firm* — Laurence A. Greenberg; Werner H. Stemer; Ralph E. Locher

(57) ABSTRACT

An image of a surrounding area is projected onto a detector of a detector device by way of an optical system that produces an imaging beam path. A screen is disposed in the imaging beam path and the screen shadows a subarea of the image of the surrounding area on the detector. In order to allow an object which is dazzling the detector device to be masked out and nevertheless to allow the surrounding area to be monitored, the screen is subdivided into a plurality of segments which can be operated individually, and segments which are associated with the subarea are selected and operated, and are in this way heated. The transmission of the selected segments is reduced by the heating throughout the frequency range in which the detector is sensitive, and the selected segments of the screen thus shadow the subarea of the image.

10 Claims, 3 Drawing Sheets

(56) References Cited

U.S. PATENT DOCUMENTS

| | | |
|---|---|---|
| 2004/0188617 A1 | 9/2004 | Devitt et al. |
| 2005/0062683 A1 | 3/2005 | Tholl et al. |
| 2007/0179239 A1 | 8/2007 | Li |
| 2012/0154596 A1* | 6/2012 | Wajs .......................... 348/164 |
| 2013/0093903 A1* | 4/2013 | Leard et al. .................. 348/164 |

* cited by examiner

METHOD AND APPARATUS FOR IMAGING A SURROUNDING AREA ONTO A DETECTOR DEVICE

CROSS-REFERENCE TO RELATED APPLICATION

This application claims the priority, under 35 U.S.C. §119, of German patent application DE 10 2010 006 664.8, filed Feb. 3, 2010; the prior application is herewith incorporated by reference in its entirety.

BACKGROUND OF THE INVENTION

Field of the Invention

The invention relates to a method for imaging a surrounding area on a detector in which an optical system produces an imaging beam path, and a screen, which is arranged in the imaging beam path, shadows a subarea of the image of the surrounding area on the detector device.

Cameras for monitoring the surrounding area are normally equipped with electrooptional sensors, for example matrix detectors, on which the surrounding area is imaged and, after electronic evaluation, may be displayed on a screen. If the image contains a point radiation source or a radiation source which has a small extent in comparison with the dimensions of the field of view of the electrooptical sensor but is strong, for example the sun, then this leads to dazzling in the reproduced image, which interferes with the image quality in an area around the imaged radiation source. In the worst case, this even leads to damage to the detector. Furthermore, when a strong radiation source is present in the field of view of the sensor, the extent of the scene dynamics that can be detected is greatly restricted.

In order to avoid such effects, the electromagnetic radiation which is incident on the detector is prevented by varying the alignment of the detector, for example by varying the alignment of the imaging optical system. Another possibility is to close a shutter, thus preventing radiation from passing through to the detector, and therefore completely protecting the detector.

SUMMARY OF THE INVENTION

It is accordingly an object of the invention to provide a method and device for imaging the surroundings onto a detector device which overcome the above-mentioned disadvantages of the heretofore-known devices and methods of this general type and by means of which the surrounding area can be monitored reliably even when a strong radiation source is present.

With the foregoing and other objects in view there is provided, in accordance with the invention, a method of imaging a surrounding area on a detector of a detector device, the method which comprises:

producing an imaging beam path through an optical system to the detector;
placing a screen in the imaging beam path, wherein the screen is divided into a plurality of segments that can be operated individually;
selecting specific segments associated with a given subarea of an image of the surrounding area on the detector;
heating the selected segments and reducing a transmission of the selected segments throughout a frequency range in which the detector is sensitive, and shadowing the subarea of the image on the detector with the selected segments of the screen.

In other words, the objects relating to the method are achieved by a method of the type mentioned initially in which, according to the invention, the screen is subdivided into a plurality of segments which can be operated individually, and segments which are associated with the subarea are selected and operated, and are in this way heated, and the transmission of the selected segments is reduced by the heating throughout the frequency range in which the detector is sensitive—in particular to excessively high illumination—and the selected segments of the screen shadow the subarea of the image. As a result of a selection of some of the segments of the screen, the rest of the area of the screen at least substantially retains its normal transmission. The subarea of the image to be shadowed can therefore be selected. The shadow can be placed in the image of the surrounding area such that a strong radiation source is shadowed while, in contrast, the areas of the image located outside the shadowing can still be evaluated, and the corresponding parts of the surrounding area can be monitored.

The selection of the segments to be heated, that is to say the area of the screen which is intended to be heated in order to shadow the subarea, which is also referred to in the following text as the area to be heated, can be made by a control device which controls the corresponding circuits for heating the selected segments. The control device is prepared for this purpose by one or more corresponding control programs whose running—for example in conjunction with suitable input signals, such as sensor signals—results in such control. The corresponding control program or programs provides the control device with the capability to carry out the stated processes such that the corresponding control is carried out when the program is run. The control device is prepared to control one, a number or all of the method steps which are described in the following text, and in the description of the figures.

The detector device expediently has at least one detector, in particular a matrix detector which—depending on the application—can carry out processing simultaneously or exclusively in the spectral ranges ultraviolet, visible light, near infrared, short-wave infrared, medium-wave infrared and long-wave infrared. The image expediently covers a certain angle range of the surrounding area from the view of the optical system, such that this section of the surrounding area can be monitored. An angle range of 10°×10° is frequently covered by one image. The optical system may be imaging optics comprising refractive, diffractive or reflective elements, or any desired combination thereof.

The transmission can be reduced by the heated area of the screen more or less completely absorbing and/or reflecting the radiation which is incident through the optical system in at least that wavelength range in which the detector is sensitive.

The screen advantageously contains thermochromic material. Material such as this carries out a phase change at a specific temperature, for example a semiconductor-metal phase change, and in the process fundamentally changes its optical characteristics, in such a way that heating of the material can reduce the transparency down to zero. Suitable materials are a number of oxides of vanadium $V_xO_y$, for example $VO_2$, which carries out a semiconductor-metal change at 68° C., $V_2O_3$, whose critical temperature is at −123° C., or non-stoichiometric mixtures. The appropriate thermochromic material is advantageously applied as a coating to a screen support material, expediently with a thickness of 0.1 μm to 1 μm. Materials which are transparent in the infrared range are suitable for use as the screen support material, such as silicon, germanium, ZnSe or ZnS. It is also expedient for the thermochromic coating to be applied to a good heat carrier as an intermediate layer, in order to allow heat which is introduced to be dissipated quickly again, as a result of which the layer is transparent again. A synthetic diamond layer, in particular with a thickness between 10 µm and 50 µm, is particularly suitable.

By way of example, the screen may be subdivided correspondingly to the pixels of the detector, such that each pixel is associated with one segment. The segments of the screen can be heated individually and separately from one another. For this purpose, the segments can be thermally isolated from one another, for example by a web between two segments in each case. Each segment can be provided with a heating element which is used to heat only this segment. The heating element may have a coating on a support material for the screen, which is heated with the aid of electrical voltage. Metals or alloys with titanium and/or platinum are particularly suitable for this purpose. The coat may be in the form of a frame around the segment to be heated or may be arranged on two opposite sides on two edges of the segment.

Advantageously, the selected segments are heated by supplying electrical power. An electrical voltage can be applied to heating elements for the segments, whose resistance produces the heat. Electrical conductors are expediently connected to each segment for this purpose, and supply electrical power only to this segment.

Alternatively or additionally, one or more segments can be heated by supplying optical power. Power can be supplied through an optical conductor which is in each case connected to one segment and supplies power only to this segment. Illumination from an optical waveguide across a distance through air is also possible, the radiation from which is directed at one or more segments—successively or simultaneously. The radiation for supplying optical power can be introduced behind an aperture stop of the optical system, expediently behind the entire optical system, into the beam path from the side, and can be directed at the screen. It is expediently radiation which is directed at the screen with the aid of optics, and whose frequency is outside the sensitivity range of the detector device. This radiation is advantageously produced by a laser, although one or more LEDs is or are also alternatively possible as the radiation source.

The method according to the invention is advantageously developed such that dazzling or a dazzling object in an image of the surrounding area is identified, and the subarea of the image, and therefore also the heated area or the area to be heated, is selected on the basis of the position—and in particular additionally on the basis of the extent—of the dazzling in the image. This can be identified by image processing, for example by an intensity measurement of the incident radiation, in which case this intensity is classified as dazzling if the intensity exceeds a limit value. Alternatively or additionally, it is possible to select the area to be heated as a function of a characteristic of a dazzling object, for example its position, size and/or shape, its dynamic and/or its beam strength.

The area to be heated is advantageously moved over the image with any movement of a dazzling object, such that the shadow correspondingly changes its position in the image.

If the position of a dazzling object in space is known in advance, then there is no need for image-processing methods for selection of the area to be heated. For example, the selection of the subarea can be determined from the known position of the dazzling object in space, and from the alignment of the optical system in space. If required, the selection of the heated segments can be matched to any movement, known in advance, of the dazzling object in the field of view, such that the dazzling object is always completely shadowed.

Alternatively or additionally, it is advantageous for the position of the area to be heated, that is to say the segments to be selected, to be controlled on the basis of a characteristic of a dazzling object or dazzling by the dazzling object. By way of example, although the sun is shadowed by a screen which moves with it, it is possible, however, for the shadowing to be incomplete because the optical system itself has moved to a major extent, and for one edge of the sun to emerge from the shadowing from time to time. If the dazzling which results from this is identified as such, and its position in the field of view is identified, then the position of the area to be heated can be readjusted by the closed-loop control system, and the dazzling object can be completely or essentially completely shadowed again in a very short time.

In order to allow a shadowed dazzling object to be monitored precisely, it is advantageous for it still to be visible through the shadowing. For this purpose, the shadowing is not complete, such that a residual transparency remains. In order to prevent damage to the detector device, this residual transparency is advantageously controlled such that the screen is heated in an area to be heated such that it is opaque at the frequencies at which the detector device is sensitive, and the heating is reduced until a selected partial transmission level is achieved. The transmission level can be selected by image evaluation, by reducing the heating, and therefore increasing the transmission level, until the dazzling object is visible to a predetermined extent.

In order to quickly reduce the transparency of the screen in the selected area, it is advantageous for the screen to be kept at a temperature which is close to the critical temperature at which the screen changes its transparency, for example carries out a phase change, even before it is heated, at least in places. Suitable separations from the critical temperature are of 1° C. to 20° C. For this purpose, the screen can be preheated as an entity or in a selected area, which can be made dependent on a characteristic of a dazzling object and is larger than the subarea, to be precise before the transparency of the selected segments is reduced by further heating. The preheating does not reduce the transparency of the preheated part of the screen, or reduces it only to a minor extent, for example by less than 5% over the frequency range of the detector. The heating is expediently carried out to a predetermined screen temperature.

The closer the heating temperature is to the critical temperature of the screen, the greater the extent to which heating of the selected segments leads to the heat that is introduced also heating edge areas outside the area to be heated, thus reducing their transparency. This results in a gradual reduction in transparency around the area to be heated. The size of the area outside the selected area whose transparency is considerably reduced, at least by more than 50%, by the heating is referred to in the following text as the edge shadow area, and this can be set by the preheating temperature.

This is advantageous in order to allow dazzling objects with different movement dynamics to be masked out effectively without extensive image interference. If a dazzling object has low movement dynamics, that is to say it is moving slowly over the field of view, a small edge shadow area or no edge shadow area is sufficient, since the heated area can be slaved to the dazzling object in the field of view, corresponding to the slow movement. In the case of high dynamics, it is possible for the heated area not to follow the movement of the dazzling object sufficiently quickly, that is to say the segments to be heated cannot be changed quickly enough, and the dazzling object, or its image, to leave the shadow area. If there is no edge shadow area, the full intensity of that part of the dazzling object which emerges from the shadow strikes the detector without being reduced.

Part of the dazzling object admittedly emerges from the core shadow of the screen in an edge shadow area, but it remains in the partial shadow of the edge shadow area which gradually becomes more transparent outwards. Depending on the size of the edge shadow area, the emerging part is still greatly attenuated. The emerging part of the dazzling object can be identified, and the area to be heated can be appropriately readjusted, such that the dazzling object is once again located in the core shadow, and is completely screened. The preheating is advantageously set as a function of a characteristic of a dazzling object in the image. Control of the preheating may comprise control of a characteristic such as the size, shape and position of the area to be preheated. Furthermore, a characteristic of an edge shadow area may be selected and may be controlled by the preheating. A desired characteristic of the edge shadow area can be determined corresponding to a characteristic of a dazzling object, and preheating is controlled as a function of the characteristic.

Instead of or in addition to prior calculation of the position of a dazzling object and the appropriate positioning of the screen, a second detector can be used to identify the position of a dazzling object, for example by image-processing methods, and to position the area to be heated such that radiation from the dazzling object does not reach the first detector. For this purpose, the dector device expediently has a first and a second detector, and the beam path for the first detector is interrupted, in particular completely interrupted, such that no radiation any longer strikes this first detector from outside the apparatus, the subarea is selected with the aid of the second detector, for example by evaluating the image of the second detector with the aid of image-processing methods, and the dazzling object and its position in the image are identified, the position of the area to be heated is then defined, and the segments are heated, and the beam path to the first detector is opened again. The position of the dazzling object can be tracked with the aid of the image obtained by the second detector, and the area to be heated can be positioned appropriately in front of the first detector, such that the dazzling object is always masked out of the image of the first detector.

With the above and other objects in view there is also provided, in accordance with the invention, an apparatus for imaging a surrounding area on a detector of a detector device, comprising:
an optical system defining an imaging beam path from the surrounding area to the detector;
a screen disposed in the imaging beam path, the screen being divided into a plurality of segments to be operated individually, with each segment corresponding to a subarea of an image of the surrounding area on the detector and each segment having a heating element; and
a control device connected to said screen, said control device being configured to select segments associated a subarea and to operate said heating elements for heating the selected said segments, wherein the heating reduces a transmission of the selected said segments of said screen throughout a frequency range in which the detector is sensitive, and the selected said segments shadow the subarea of the image on the detector.

The invention thus also relates to an apparatus for imaging a surrounding area on a detector device having an optical system for production of an imaging beam path, and having a screen, which is arranged in the imaging beam path, for shadowing a subarea of the image of the surrounding area on the detector device.

In other words, the objects relating to the apparatus are achieved in that the screen is subdivided into a plurality of segments which can be operated individually and each segment has a heating element, and a control device is provided and is prepared to select segments associated with the subarea and to operate heating elements such that the selected segments are heated, wherein the transmission of the selected segments of the screen is reduced by the heating throughout the frequency range in which the detector is sensitive, and the selected segments shadow the subarea of the image. A subarea to be shadowed can in this way be shadowed quickly, as a result of which it is possible to take precautions against image interference or damage to the detector device. The screen advantageously crosses through the entire beam path, as a result of which it completely shadows the detector when completely heated.

One embodiment of the invention provides for the optical system to produce a beam path which is telecentric on the image side, and in which the screen is arranged. In the telecentric beam path, the shadowing of the screen remains at least essentially of the same size, irrespective of its position in the field of view, thus making it possible to achieve shadowing of homogeneous size even at the edges of the field of view, when the illuminated area is positioned there.

It is also advantageous for the detector device to have at least two detectors, whose absolute and/or spectral sensitivities are different to one another. The two detectors are expediently directed at least essentially at the same section of the surrounding area. In this case, the first detector can be used to display the image of the surrounding area, and the second can be prepared for determining a characteristic of the dazzling object.

The screen is expediently at a distance of no more than $\frac{1}{10}$ of the focal length of a lens of the optical system which directs the beam at the screen away from an image plane of the optical system, in order to keep vignetting of the image low. It is also advantageous for the screen to be moved in the direction of the optical axis. This makes it possible to deliberately use and vary vignetting of the image by means of the screen. This invention detail can be used alternatively or additionally for setting the edge shadow area by heating.

Other features which are considered as characteristic for the invention are set forth in the appended claims.

Although the invention is illustrated and described herein as embodied in a method and apparatus for imaging a surrounding area on a detector device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. While the drawing and the description contain numerous features in combination, those of skill in the pertinent art will also expediently and readily consider them individually, and combine to make further worthwhile combinations.

DETAILED DESCRIPTION OF THE INVENTION

Figure 1:
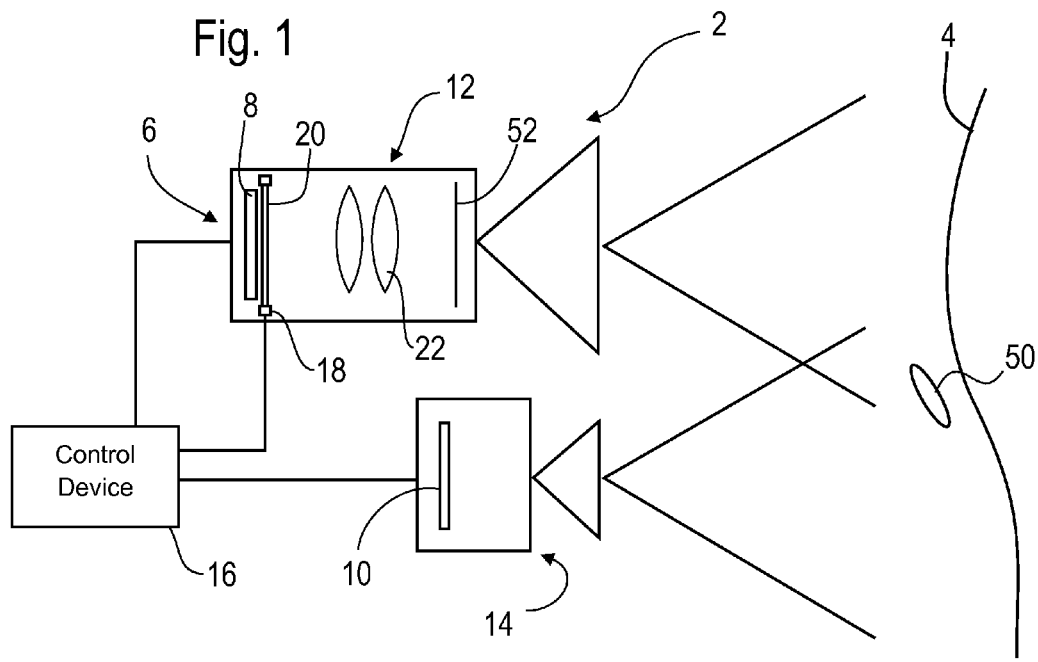
FIG. 1 is a schematic illustration of an apparatus for imaging a surrounding area by way of a detector device which has two different detectors.

Referring now to the figures of the drawing in detail and first, particularly, to FIG. 1 thereof, there is shown an apparatus 2 for imaging a surrounding area 4 on a detector device 6, which has two detectors 8, 10. The detectors 8, 10 are components of two different cameras 12, 14, which both have a field of view of 60°×60° into the surrounding area 4, with both cameras 12, 14 recording the same section of the surrounding area 4. Both cameras 12, 14 are connected to a control device 16, also referred to as a controller or control means 16, which is in the form of an electronic data processing unit. The control device 16 has a computer program which is configured to control a heating apparatus 18 (indicated merely symbolically in FIG. 1) for heating a screen 20 in front of the detector 8, and for selection of a subarea of the image on the detector 8 which is intended to be covered by the panel 20. The screen 20 may also be referred to as a diaphragm 20, as is conventional in optics, or a panel 20.

The detector 8 is a microbolometer which is sensitive in the infrared spectral range (long-wave infrared between 8 μm and 12 μm) and is arranged in a vacuum vessel. The detector 10 is likewise a matrix detector, but is considerably less sensitive, although over a wider spectral range, than the detector 8. While the camera 12 is designed for imaging and monitoring the surrounding area 4, the camera 14 is designed to identify dazzling objects in the field of view of the camera 12, in which case the position of the dazzling object in the field of view of the camera 14, and therefore in the field of view of the camera 12, is determined with the aid of the control device 16.

Figure 2:
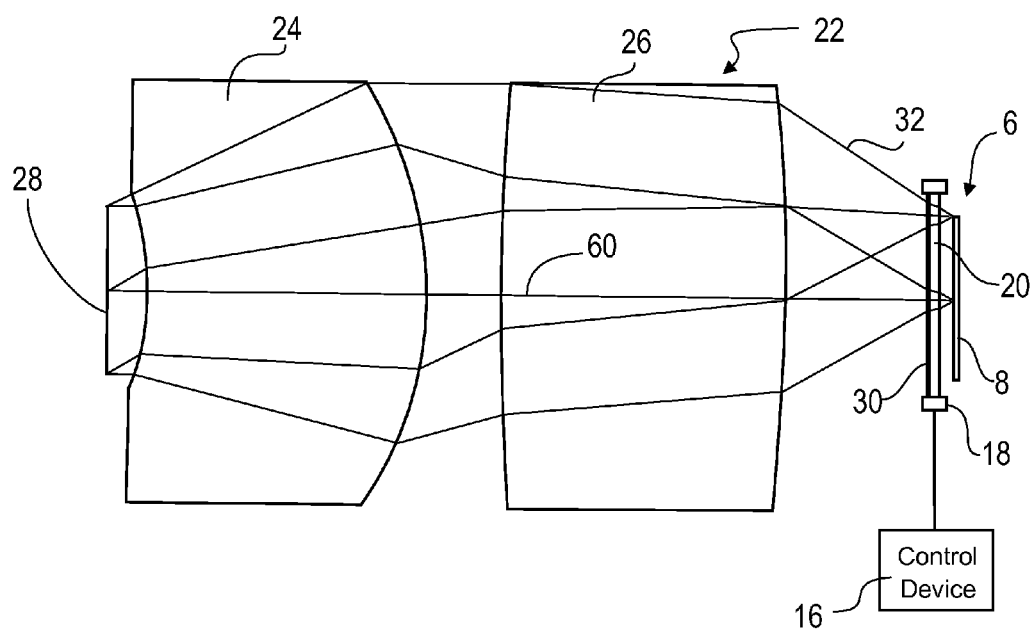
FIG. 2 is a schematic view of an optical system on one of the detectors of the detector device shown in FIG. 1.

FIG. 2 shows an optical system 22 and that part of the detector device 6 which is arranged in the camera 12. The optical system 22 has an objective with single-stage optics with a field of view of 60°×60°, and a focal length of 18 mm. The f-number is 1. It comprises two lenses 24, 26 composed of germanium, and the aperture stop 28 is arranged immediately in front of the first lens 24. The objective has a beam path which is telecentric on the image side, that is to say the beam cones of the pixels on the detector 8 are parallel.

That part of the detector device 6 which is located in the camera 12 has, in addition to the detector 8, a vacuum vessel with a detector window in front of the detector 8, through which the beam path 32 of the objective passes, and strikes the detector 8. The distance between the screen 20 and the detector window is 0.5 mm.

The screen 20 is arranged in the beam path 32 such that it crosses through the entire beam path 32, and can therefore block all the radiation that is incident through the aperture stop 28 on the detector 8. It has a highly thermally conductive intermediate layer which is coated facing the optical system 22 with a thermochromic layer 30 of vanadium dioxide, which is indicated as a thick line in FIG. 2. A support layer, which is arranged opposite the thermochromic layer 30 and is used as a heat sink, is used to dissipate the heat from the thermochromic layer 30, with this heat being dissipated through the intermediate layer to the heat sink. All three layers are transparent in the infrared spectral range, in which the detector 8 is sensitive, with the thermochromic layer 30 being opaque for this spectral range above its critical temperature of 68° C.

Figure 3:
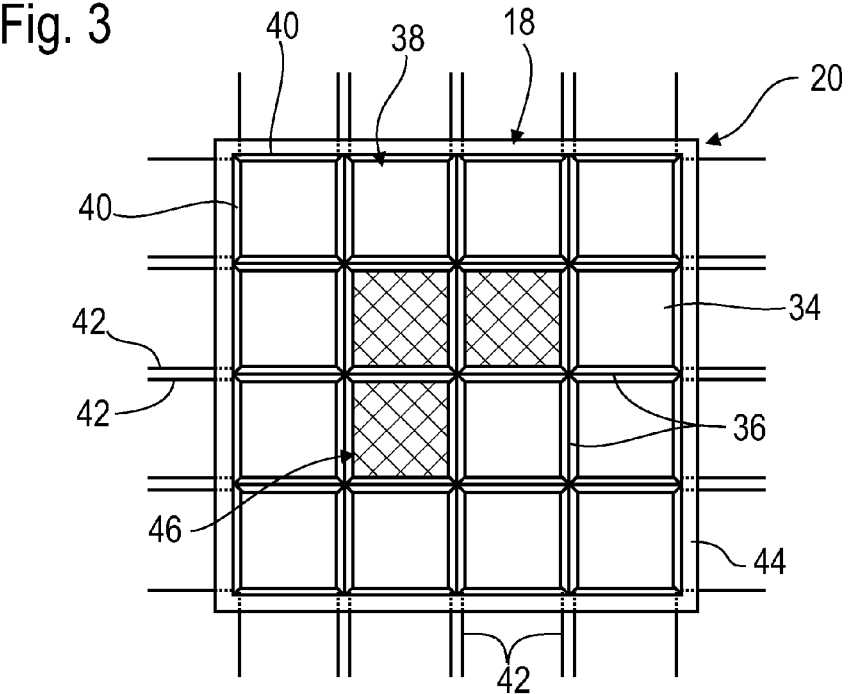
FIG. 3 is a plan view of a screen, subdivided into individual segments, in front of the detector from FIG. 2.

The screen 20 and the heating apparatus 18 are illustrated in more detail in FIG. 3. The screen is subdivided into 256× 256 segments 34, of which only 4×4 segments 34 are illustrated in FIG. 3, for clarity reasons. Each segment 34 is separated from the others by webs 36 which somewhat thermally isolate the segments 34 from one another. In order to heat the segments 34, each of them is equipped with a heating element 38 which has four heating units 40, which are applied as a metallic layer to the thermochromic material and surround a quarter of the segment 34. The heating units 40 are each provided with two electrical connections 42, which are connected to a voltage generator, which is not illustrated and is operated by the control device 16 such that all the heating units 40, and therefore the heating elements 38, can be operated separately from one another. The heating units 40 are operated by applying a voltage to them, thus heating them and transmitting the heat to the thermochromic layer 30 of the segment 34. When the thermochromic layer 30 is heated above the critical temperature for the phase change, it first of all gradually ceases to transmit light in the range between 8 μm and 12 μm, and ceases to transmit light completely at a temperature above the critical temperature. The entire screen 20 is surrounded by a heating means 44 in the form of a frame which—operated by the control device 16—preheats the screen 20 as an entity to a temperature that is predetermined by the control device 16.

The apparatus 2 is used as a monitoring system for monitoring the surrounding area 4, and the screen 20 is used for protection against an excessively high illumination intensity on the detector 8, for example from solar radiation. There is no need for the camera 14 in this example. The control device 16 calculates the position of the sun in the image of the surrounding area 4 on the detector 8, and determines a subarea of the image which completely surrounds a dazzling object 50, in this example the sun. Those segments 34 which completely shadow the subarea are determined on the basis of the subarea or directly from the state of the dazzling object 50 in the image. They form the heated area, or area to be heated, 46. Three such segments 34 are illustrated in a shaded form in FIG. 3, as an example. The terms the selected segments 34, the heated area 46 or area 46 to be heated of the screen and of the subarea of the image which is shadowed or is to be shadowed are used synonymously. The control device 16 now controls the heating elements 38 such that the selected segments 34 are heated above the critical temperature, and the dazzling object 50 is completely masked out from the image of the surrounding area 4 on the detector 8.

Furthermore, the control device 16, which has an image processing unit, can detect a potential dazzling object 50, which is initially not dazzling, from the image of the surrounding area 4. A dazzling object 50 may be an aircraft or some other airborne vehicle, or a vehicle or the like. The identification of a potential dazzling object 50 can be determined by a characteristic of the dazzling object 50, for example a shape or some other characteristic of the appearance, an emission characteristic, for example that of an engine, and/or movement dynamics. It is also possible to identify the potential dazzling object 50 by radar, which is connected for data transmission purposes to the control device 16. The subarea to be shadowed and the segments 34 of the screen 20 for masking out the dazzling object 50 can be chosen as appropriate from the identified position of the potential dazzling object in space or in the field of view, and the heating of the segments 34 can be started such that the subarea around the dazzling object 50 is shadowed before it produces dazzling.

First of all, the heating is carried out such that the selected segments 34 of the screen 20 become completely opaque, and therefore do not transmit light in the sensitivity range of the detector 8. The area 46 to be heated for this purpose is illustrated in FIG. 3 on the basis of three shadowing segments 34, and in FIG. 4 on the basis of an example of a circle, although any other shapes for the area 46 to be heated are possible. The power introduced, and therefore the heating, are then reduced to such an extent that the temperature of the screen 20 in the area 46 falls to the critical temperature, such that the thermochromic material becomes transparent again. The dazzling object 50 is once again initially visible in the image, and can be identified and tracked on the basis of image processing. The heating of the area 46 is now controlled on the basis of a characteristic of the dazzling object 50 in the image. Open-loop or closed-loop control on the basis of one characteristic of the dazzling object 50 is generally advantageous. The power is expediently adjusted such that the dazzling object 50 is still identifiable, but its radiation does not interfere with the image. Other characteristics, such as radiation continuity of the dazzling object 50, can also be used for open-loop or closed-loop control of the power introduced. In general terms, the open-loop or closed-loop control of the power introduced is carried out from results of image evaluation of the image of the detector device 6.

Furthermore, there is an image processing program within the control device 16, which evaluates an illumination intensity of each pixel of the matrix detector 8 and/or of the matrix detector 10 in the camera 14. If the intensity in at least one pixel exceeds a limit value, then a masking-out process is started with the aid of a program or program part which is run by the control device 16. For example, if the radiation intensity in the dazzled pixel is above the first limit value but below a second limit value, such that the radiation is not classified as a risk of damage to the detector 8, despite interfering with the image, the position of the dazzled pixel can be determined with the aid of the detector 8, and the shadowing can be left. If the dazzling object 50 emerges from the shadowed area in the image, then pixels at the edge of the shadow are dazzled, as a result of which their intensity rises above the limit value. This is registered by the control device 16, and the position of the shadowing is controlled in accordance with the measured radiation intensities such that the shadowing is moved over the dazzled pixels. The controlled variable is a radiation intensity measured on the detector 8 or detector 10.

If a measured intensity exceeds a second limit value, then a shutter 52 in the first camera 12 is closed, as a result of which the beam path 32 is completely interrupted, or radiation no longer strikes the aperture stop 28. It is therefore no longer possible to monitor the surrounding area with the aid of the camera 12. Instead of this, coarser monitoring of the surrounding area 4 can be carried out with the aid of the camera 14, whose purpose is now to detect the position of the dazzling object in the field of view or in the image. This is carried out by an intensity measurement of the radiation on the pixels of the detector 10 or its signal strength, with the aid of the control device 16. As soon as the position of the dazzling object 50 is determined in the field of view or in the image, the relevant image area and a predetermined surrounding area, together the subarea, are shadowed by it. The shutter 52 is then opened again and monitoring of the surrounding area is continued, with the dazzling object 50 being completely masked out by the shadowing in the image. The position of the shadowing in the image is continuously readjusted with the aid of the radiation intensities measured at the detector 10, from which the position of the dazzling object 50 in the image is continuously monitored. It is, of course, also possible to track the position of a dazzling object 50 with the aid of the detector 8, when the radiation intensity of the dazzling object 50 is only between the two limit values. It is likewise possible to dispense with the camera 14, and to carry out the intensity evaluation and/or position measurement of the dazzling object only with the aid of the detector 8.

The size and shape of the heated area 46 and therefore the shadow on the detector 8 may be selected as required and, in the extreme, may also cover the entire image. The greater the shadowing, the more power is introduced into the screen 20. This power can be applied solely by the heating elements 38. In cold ambient temperatures and/or for large areas 46, it is worthwhile introducing a portion of the power through the heating means 44, by means of which the screen 20 is preheated. The temperature of the screen 20 is detected by a sensor which is connected to the control device 16 and scans the entire area of the screen 20. The preheating power may be made dependent on the ambient temperature, the temperature of the screen 20 and/or the size of the area 46 to be heated.

A size of the area 46 to be heated, and therefore of a shadow in the image, can be matched to a characteristic, for example a size, of an identified dazzling object 50. In this case, attention can be paid to selecting the size of the area 46 to be heated such that there is always a fixed distance between the edge of the dazzling object 50 and the edge of the shadowing. This distance may be influenced by a number of factors. One factor may be a radiation intensity of the dazzling object 50 per unit area on the detector 8. Movement dynamics of the dazzling object 50 in the image can also be used as an open-loop or closed-loop controlled variable for setting the size of the shadowing, and therefore of the subarea. If the dazzling object 50 has low movement dynamics, that is to say it is moving at slow speed in the image, it is sufficient to leave the shadowing small, since the risk of the dazzling object 50 emerging without being noticed from the shadowing in the image is low. In the case of high movement dynamics, it is worthwhile to set the shadowing to be large, such that the dazzling object 50 remains shadowed even in the case of fast and unexpected movements. In general terms, the size of the area 46 and therefore of the shadowing is set as a function of a characteristic, in particular of the movement dynamics of the dazzling object 50 in the image.

Figure 4:
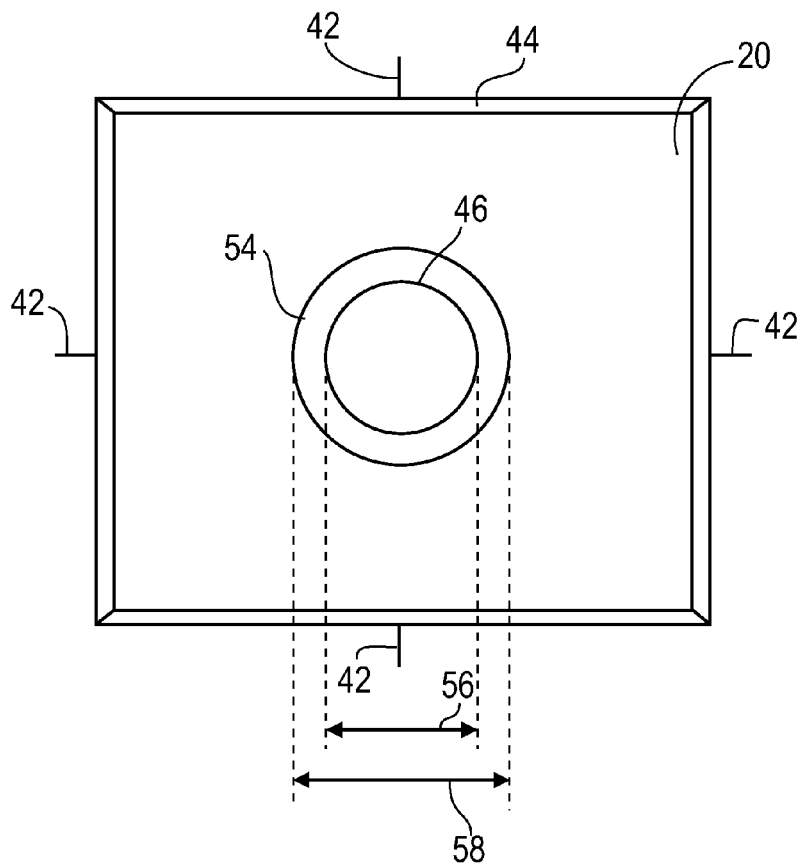
FIG. 4 is a plan view of a heated area of the screen from FIG. 3 which is surrounded by an edge shadow area.

FIG. 4 shows an edge shadow area 54 which is made usable around the heated area 46. The size of the edge shadow area 54 may be set by the preheating temperature of the screen 20 and, alternatively or additionally, by the heating power of the heating elements 38 per unit area. The higher the preheating temperature of the screen 20 and/or the heating power of the heating elements 38 is, the larger is the edge shadow area 54 with respect to the width of the edge shadow area 54 which results in FIG. 4 from the illuminated area 46, which forms a core shadow with a first diameter 56, and the edge shadow area 54, which forms a partial shadow with a larger diameter 58. Half of the difference between the two diameters 56 and 58, and therefore the width and/or size of the edge shadow area 54, can thus be set.

A similar effect can be achieved by vignetting of the image by the shadowing, if this is not located on an image plane of the optical system 22. The further the screen 20 is away from the image plane, the greater is the vignetting. The vignetting can be adjusted by moving the screen 20 in the beam path 32 in the direction of the optical axis 60. The further the screen 20 is away from the image plane, the greater is the vignetting, and the ratio of the large diameter 58 to the small diameter 56, even without an edge shadow area 54. The movement of the screen 20 parallel to the optical axis 60 is likewise controlled by the control device 16, in which case closed-loop control is also feasible.

The vignetting and/or the edge shadow area 54 are/is adjusted by the control device 16 as a function of a characteristic of the dazzling object 50.

The characteristic may be movement dynamics of the dazzling object 50, a speed of the dazzling object 50 in the image, a size and/or a radiation intensity of the dazzling object 50.

Figure 5:
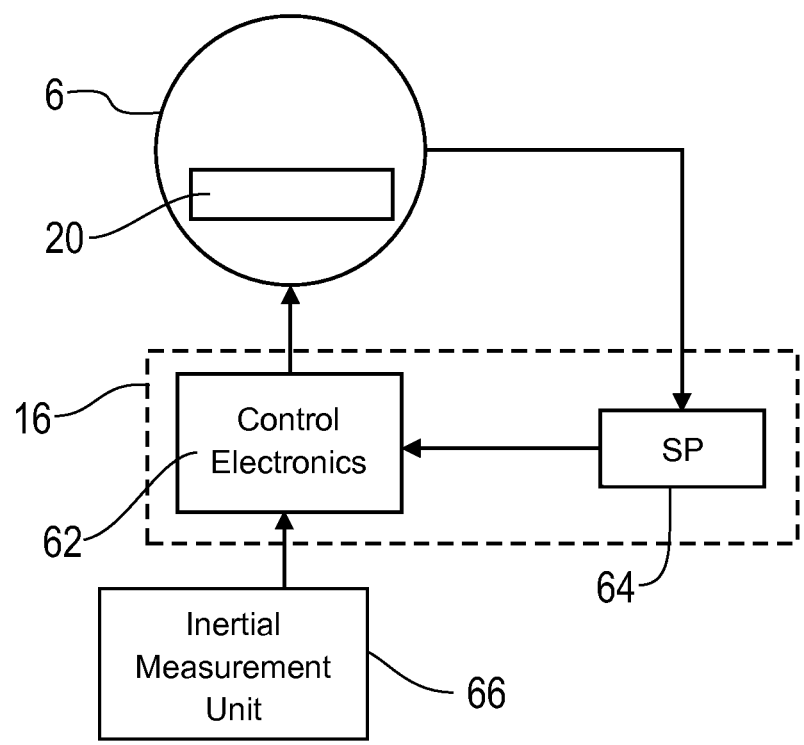
FIG. 5 is a diagram of a control loop for the selection of segments to be heated in the screen of FIG. 4.

An open or closed control loop for selection of the shadowing segments 34 and for setting the heated area 46 is illustrated in FIG. 5. The detector device 6 is part of a seeker head of a missile, and contains the screen 20. This is driven by control electronics 62 with control data for shadowing the detector 8. The detector device 6 supplies sensor data to signal processing 64, which uses image processing to identify the dazzling object 50 and its position in the image. The apparatus's own position data is determined with the aid of an inertial measurement unit 66, including the alignment of the cameras 12, 14 in the surrounding area 4. The control device determines the position data of the dazzling object 50 from its own position data and the position of the dazzling object in the image. This or directly the data relating to the position of the dazzling object 50 in the image is used to produce the control data for the screen 20 and the heating apparatus 18. The sensor data is used to continuously correct the control data, such that the dazzling object 50 is always completely or partially shadowed. The dazzling in the image or the position of the dazzling object 50 in the image within the shadowing can in this case be used as a controlled variable.

The invention claimed is:

1. A method of imaging a surrounding area on a detector of a detector device, the method which comprises:
   producing an imaging beam path through an optical system to the detector;
   placing a screen in the imaging beam path, wherein the screen is divided into a plurality of segments that can be operated individually;
   selecting specific segments associated with a given subarea of an image of the surrounding area on the detector;
   heating the selected segments and reducing a transmission of the selected segments throughout a frequency range in which the detector is sensitive, and shadowing the subarea of the image on the detector with the selected segments of the screen.

2. The method according to claim 1, which comprises heating the selected segments by supplying electrical power.

3. The method according to claim 1, which comprises heating the selected segments by supplying optical radiation.

4. The method according to claim 1, wherein the heated segments form a heated area, and changing a characteristic of the heated area on a basis of the knowledge about a dazzling object.

5. The method according to claim 1, which comprises preheating the screen in an area that is larger than the subarea, prior to reducing a transparency of the selected segments by further heating.

6. The method according to claim 5, which comprises controlling the preheating in dependence on a characteristic of a dazzling object.

7. The method according to claim 5, which comprises selecting and controlling a characteristic of an edge shadow area by the preheating.

8. The method according to claim 1, wherein the detector device has a first detector and a second detector each with a respective beam path, and the method further comprises:
   completely interrupting the beam path to the first detector;
   selecting the specific segments associated with the subarea to be shadowed with the aid of the second detector;
   heating the selected segments; and
   subsequently opening the beam path to the first detector.

9. An apparatus for imaging a surrounding area on a detector of a detector device, comprising:
   an optical system defining an imaging beam path from the surrounding area to the detector;
   a screen disposed in the imaging beam path, said screen being divided into a plurality of segments to be operated individually, with each segment corresponding to a subarea of an image of the surrounding area on the detector and each segment having a heating element; and
   a control device connected to said screen, said control device being configured to select segments associated a subarea and to operate said heating elements for heating the selected said segments, wherein the heating reduces a transmission of the selected said segments of said screen throughout a frequency range in which the detector is sensitive, and the selected said segments shadow the subarea of the image on the detector.

10. The apparatus according to claim 9, wherein said screen is movably supported parallel to an optical axis of said optical system.

* * * * *